(12) United States Patent
Oh et al.

(10) Patent No.: US 8,483,334 B2
(45) Date of Patent: Jul. 9, 2013

(54) AUTOMATIC GAIN CONTROL APPARATUS AND METHOD USING EFFECTIVE RECEIVING STRUCTURE OF IMPULSE RADIO ULTRA-WIDE BAND WIRELESS COMMUNICATION SYSTEM

(75) Inventors: Jung-yeol Oh, Daejeon (KR); Min Su Kil, Daejeon (KR); Jae Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 709 days.

(21) Appl. No.: 12/604,561

(22) Filed: Oct. 23, 2009

(65) Prior Publication Data
US 2010/0118917 A1    May 13, 2010

(30) Foreign Application Priority Data

Nov. 13, 2008  (KR) .................. 10-2008-0112953
Apr. 9, 2009    (KR) .................. 10-2009-0030990

(51) Int. Cl.
*H04B 1/69*       (2011.01)
*H04L 27/06*     (2006.01)

(52) U.S. Cl.
USPC .......................................... 375/345; 375/343

(58) Field of Classification Search
USPC ............... 375/343, 318, 324, 345; 455/245.1, 455/247.1, 232.1, 242.1; 713/322, 323
See application file for complete search history.

(56) References Cited

U.S. PATENT DOCUMENTS

| | | | |
|---|---|---|---|
| 5,799,037 A | 8/1998 | Strolle et al. | |
| 5,872,815 A * | 2/1999 | Strolle et al. | 375/321 |
| 7,623,562 B2 | 11/2009 | Kang et al. | |
| 8,027,412 B2 | 9/2011 | Oh | 375/297 |
| 2005/0078767 A1* | 4/2005 | Liu | 375/297 |
| 2006/0072689 A1* | 4/2006 | Kim et al. | 375/343 |
| 2006/0083269 A1* | 4/2006 | Kang et al. | 370/509 |
| 2006/0126766 A1* | 6/2006 | Kang et al. | 375/343 |
| 2007/0280362 A1* | 12/2007 | Lin et al. | 375/260 |
| 2007/0287400 A1 | 12/2007 | Yu et al. | |
| 2008/0025386 A1* | 1/2008 | Desset et al. | 375/239 |
| 2008/0101439 A1* | 5/2008 | Huang et al. | 375/136 |
| 2008/0304604 A1* | 12/2008 | Oh | 375/345 |
| 2009/0154532 A1* | 6/2009 | Shin et al. | 375/150 |

FOREIGN PATENT DOCUMENTS

| | | |
|---|---|---|
| KR | 10-0669248 B1 | 1/2007 |
| KR | 10-0710667 B1 | 4/2007 |
| KR | 1020070044353 A | 4/2007 |
| KR | 1020000048665 A | 7/2007 |
| KR | 1020070097937 A | 10/2007 |

OTHER PUBLICATIONS

Min-Su Kil, et al; "The method of gain control for wireless communication system based on impulse signal", IEPMEK (Institute of Embedded Engineering of Korea), 2008 Autumn Conference, Nov. 14, 2008, pp. 1-4.

* cited by examiner

*Primary Examiner* — Aristocratis Fotakis
(74) *Attorney, Agent, or Firm* — Ladas & Parry LLP

(57) ABSTRACT

Provided are an automatic gain control (AGC) apparatus using an efficient receiving structure of an impulse signal-based ultra wideband wireless communication system, and a method thereof. An AGC apparatus of an impulse signal-based wireless communication system guarantees an SNR received through an analog circuit unit, outputs correlation values with respect to an impulse preamble of the received signal, outputs the maximum value of the correlation values for each symbol among the correlation values, or divides a symbol period into a plurality of groups and obtains average values through a sum of each group to output the maximum value thereof.

14 Claims, 15 Drawing Sheets

FIG. 1(Proir Art)

(a)

(b)

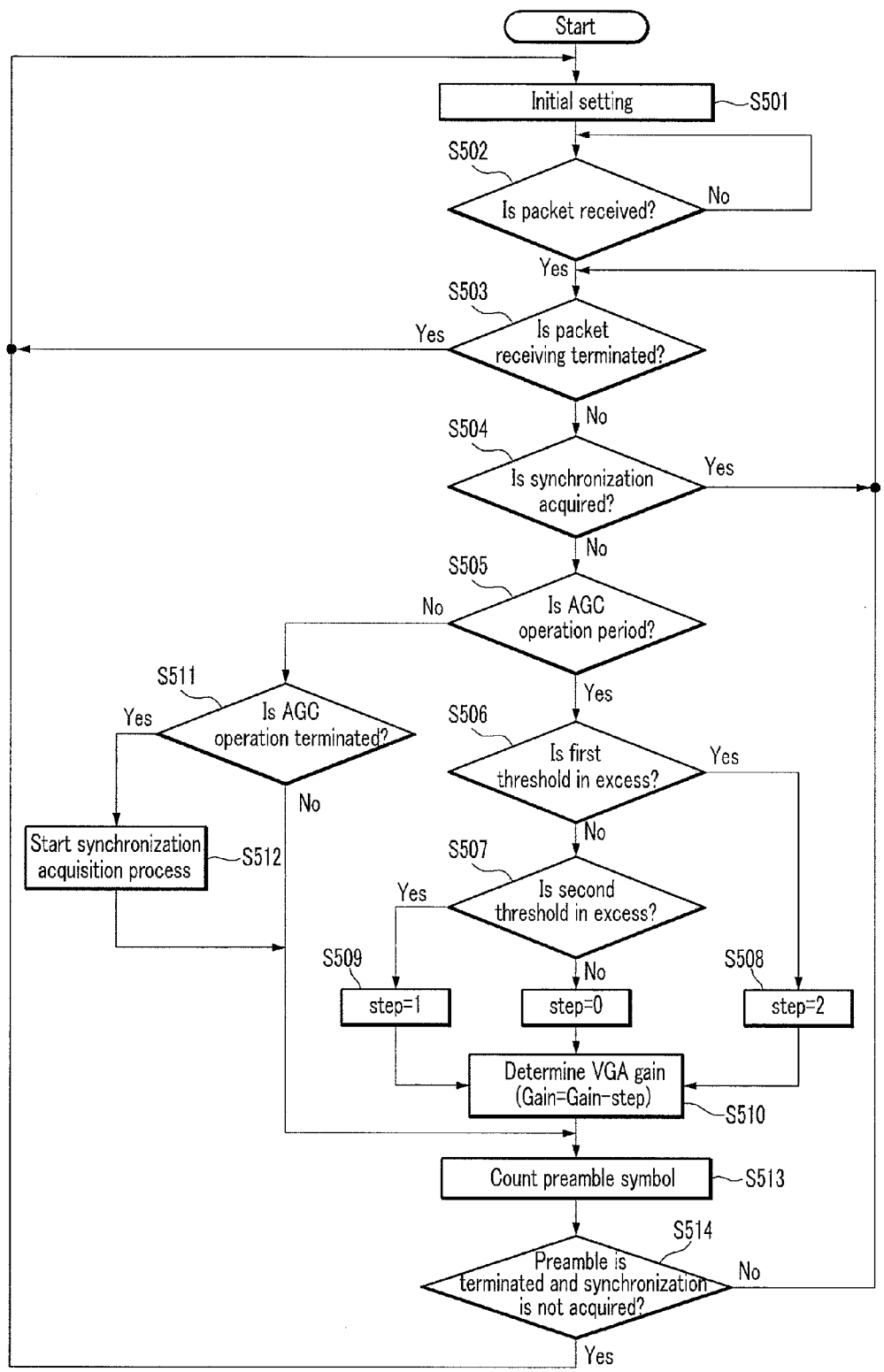

ns a gain of a low noise amplifier (LNA) and a variable gain amplifier (VGA) of the analog circuit unit based on the determined attenuation gain.

AUTOMATIC GAIN CONTROL APPARATUS AND METHOD USING EFFECTIVE RECEIVING STRUCTURE OF IMPULSE RADIO ULTRA-WIDE BAND WIRELESS COMMUNICATION SYSTEM

CROSS-REFERENCE TO RELATED APPLICATION

This application claims priority to and the benefit of Korean Patent Application Nos. 10-2008-0112953 and 10-2009-0030990 filed in the Korean Intellectual Property Office on Nov. 13, 2008 and Apr. 9, 2009, the entire contents of which are incorporated herein by reference.

BACKGROUND OF THE INVENTION (a) Field of the Invention

The present invention relates to an automatic gain control apparatus using an efficient receiving structure of an impulse signal-based ultra-wideband wireless communication system, and a method thereof.

(b) Description of the Related Art

In a general wireless communication system, a signal propagated through a transmitting antenna experiences propagation loss in a radio channel. That is, various types of attenuation including attenuation due to a propagation distance, shadow due to a peripheral geographical feature or condition, and multipath delay may occur in a substantial environment. Thus, in order to maintain a stable wireless communication condition in the radio channel environment, a voltage level of a received signal should be maintained in a constant level by using a low noise amplifier (LNA) or a variable gain amplifier (VGA).

Referring to FIG. 1, a structure of a conventional wireless communication receiver based on in-phase and quadrature (I&Q) method will be described.

FIG. 1 shows a conventional wireless communication receiver based on the I&Q method.

Referring to FIG. 1, the conventional I&Q based wireless communication receiver includes an antenna 10 receiving a radio signal, an LNA 20 low-noise-amplifying a gain of the received signal, a local oscillator 50 generating a carrier frequency, a mixer 30 converting the generated carrier frequency to a baseband signal or an IF band signal by multiplying an output signal of the LNA 20 to the carrier frequency, a low pass filter (LPF) or a band pass filter (BPF) 40 filtering the signal output from the mixer 30, a variable gain amplifier (VGA) 60 controlling the gain of the signal, an analog to digital converter (ADC) 70, and a digital signal processing block 80 including an automatic gain controller (AGC) that recovers a signal by using the received signal, and controls an operation range of the received signal by feeding back a gain control voltage to the VGA 60.

The received signal of the conventional wireless communication system is a continuous wave signal having a continuous voltage level. In addition, since a bandwidth of the signal is relatively narrow, the receiver can precisely control a voltage level of the received signal by measuring a received signal strength indication (RSSI).

The automatic gain controller of the digital signal processing block 80 may turn on/off the LNA 20 by measuring an RSSI of the received signal, or may control the RSSI of the received signal to be included within an input range by gain control of the VGA 60. The SNR can be maximized by controlling the receiving signal to have the maximum gain in an operation level of an input terminal of the ADC 70.

However, an ultra wideband (UWB) wireless system based on an impulse signal transmits a transmission signal with a power level that is lower than −41.3 dBm/MHz by using a 2 nS or less pulse due to the spectrum mask specification. In addition, due to a transmission signal characteristics of generating a discrete impulse rather than a continuous impulse, it may be difficult to determine whether there is a transmission signal at a remote distance. Due to these factors, errors in RSSI-based signal detection of received signals increase, and accordingly automatic gain controller performance using the RSSI deteriorates receiving performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an automatic gain control apparatus that enables stable receiving of received signals by using an efficient receiving structure of an impulse signal-based ultra wideband (UWB) wireless communication system, and a method thereof.

Particularly, the present invention provides an automatic gain control apparatus that controls a voltage level of a received signal for maintaining an optimum SNR for a digital demodulation system in a UWB wireless communication system based on an impulse signal of a WPAN or WBAN system, and a method thereof.

An automatic gain control (AGC) apparatus according to an exemplary embodiment of the present invention uses an effective receiving structure of an impulse signal-based UWB wireless communication system.

The AGC apparatus includes: a matched filter that attains a signal to noise ratio (SNR) of a received signal received through an analog circuit unit; a correlator that outputs a correlation signal for preamble signals of the received signal; an adder that outputs the maximum correlation value at each symbol among correlation values of the correlation signals or divides a symbol period into a plurality of groups, obtains average values through a correlation value sum of each group, and outputs the maximum value among the average values as the maximum correlation value; a comparator that compares the maximum correlation value output from the adder with at least one predetermined threshold value to determine an attenuation gain; and a gain controller that sets or changes gains of a low noise amplifier (LNA) and a variable gain amplifier (VGA) of the analog circuit unit based on the determined attenuation gain.

An AGC method using an effective receiving structure of an impulse signal-based UWB wireless communication system according to an exemplary embodiment of the present invention includes: attaining a signal to noise ratio (SNR) by parallel-processing a signal received through an analog circuit unit and outputting correlation values for impulse preambles of the received signal; outputting the maximum correlation value at each symbol among the correlation values, or dividing a symbol period into a plurality of groups, obtaining average values through a correlation value sum of each group, and outputting the maximum value among the average values as the maximum correlation value; comparing the maximum correlation value with at least one predetermined threshold value to determine an attenuation gain; and setting or changing gains of a low noise amplifier (LNA) or a variable gain amplifier (VGA) of the analog circuit unit based on the determined attenuation gain.

BRIEF DESCRIPTION OF THE DRAWINGS

FIG. 5 is a flowchart of an automatic gain control (AGC) method of an impulse signal based wireless communication system according to an exemplary embodiment of the present invention.

DETAILED DESCRIPTION OF THE EMBODIMENTS

Figure 1:
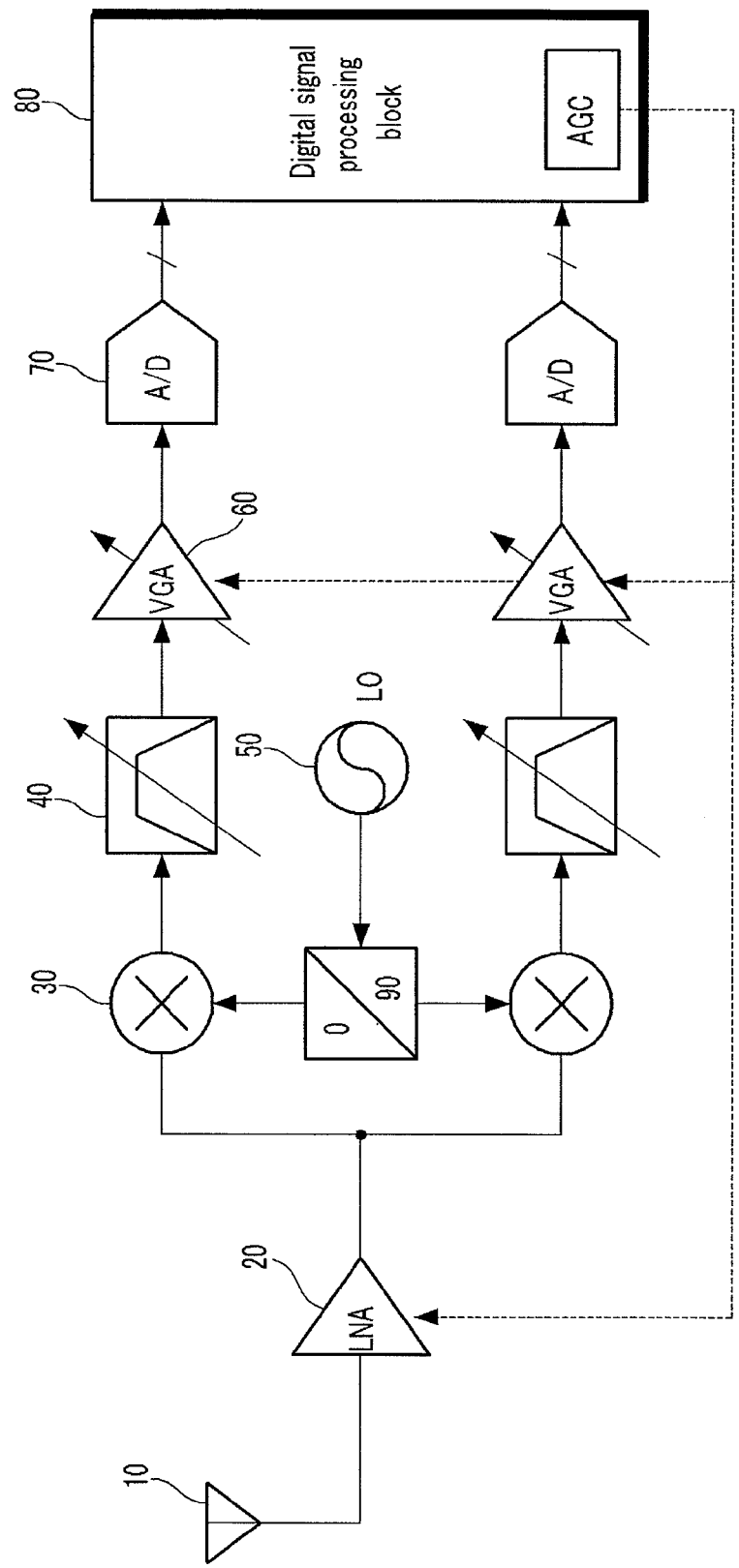
FIG. 1 shows a general orthogonal wireless communication receiving device.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, an automatic gain control (AGC) apparatus using an efficient receiving stricture of an impulse signal based ultra wideband (UWB) wireless communication system and a method thereof according to an exemplary embodiment of the present invention will be described in further detail with reference to the drawings.

Figure 2:
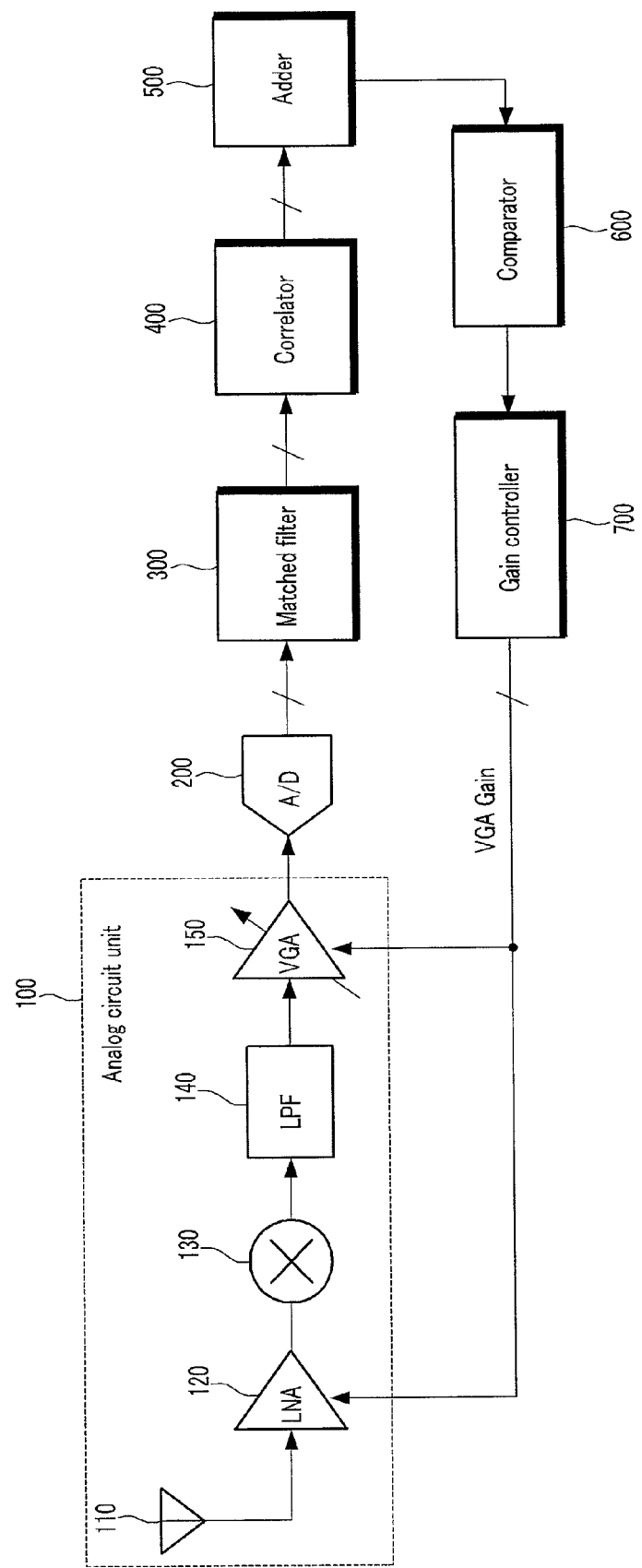
FIG. 2 shows an automatic gain control (AGC) apparatus of an impulse signal-based wireless communication system according to an exemplary embodiment of the present invention.

FIG. 2 shows an AGC apparatus of an impulse signal based wireless communication system according to an exemplary embodiment of the present invention.

Referring to FIG. 2, an AGC apparatus according to an exemplary embodiment of the present invention includes an analog circuit unit 100 including an antenna 110, a low noise amplifier (LNA) 120, a mixer 130, a low pass filter (LPF) 140, and a variable gain amplifier (VGA) 150 processing an externally received signal, an analog to digital converter (ADC) 200, a matched filter 300 for guaranteeing a signal to noise ratio (SNR) of the received signal, a correlator 400 outputting correlation signals (correlation values) with respect to preamble signals of the received signal, an adder 500 outputting the maximum value among the correlation value for each symbol or calculating averages per M correlation values and outputting the maximum value among the averages for each symbol, a comparator 600 comparing a result of the adder 500 with threshold values to determine an attenuation gain, and a gain controller 700 feeding back a result of the analog circuit unit 100 according to a result of the comparator 600 to turn on/off the LNA 120 or set or change a gain value of the VGA 150.

The analog circuit unit 100 processes a radio frequency (RF) signal received from the antenna 110. In this case, various receiving structures such as a direct conversion method or a heterodyne method may be applied. Particularly, the LNA 120 and the VGA 150 of the analog circuit unit 100 variably amplify a gain of the received signal, and turn on/off the LNA 120 according to a command received from the gain controller 700 or change a gain of the VGA 150.

The ADC 200 converts an analog signal received from the analog circuit unit 100 to a digital signal.

The matched filter 300 can be realized by using an analog filter by insertion before the ADC 200, and according to an exemplary embodiment of the present invention, as shown in FIG. 2, the matched filter 300 may be positioned at the output side of the ADC 200 and be realized as a parallel matched filter 160 for processing a high-speed sampled received signal.

The purpose of such a matched filter 300 is to provide an optimum SNR to a received signal by using the matched filter 300 of which a filter coefficient is the same as a pulse shaping filter.

For example, when a received input signal is a(k), a coefficient of the matched filter 300 is $C_l$(l=0, 1, ..., L−1) and an output signal is x(k), and the matched filter 300 is expressed as given in Equation 1

$$x(k) = \sum_{l=0}^{L-1} a(k+l) \cdot C_l \quad \text{[Equation 1]}$$

Figure 3A:
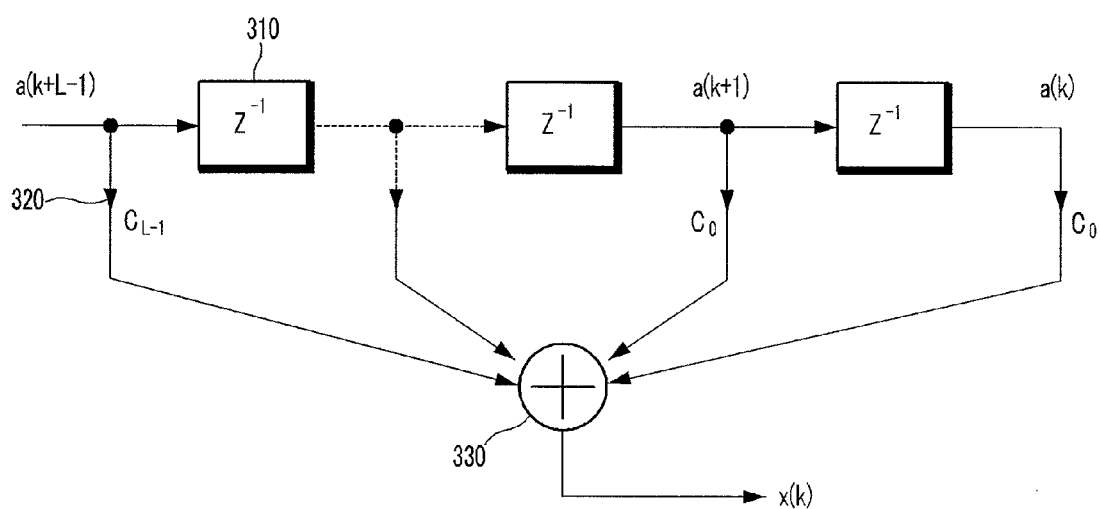
FIG. 3A shows a general finite impulse response (FIR) digital filter structure.
Figure 3B:
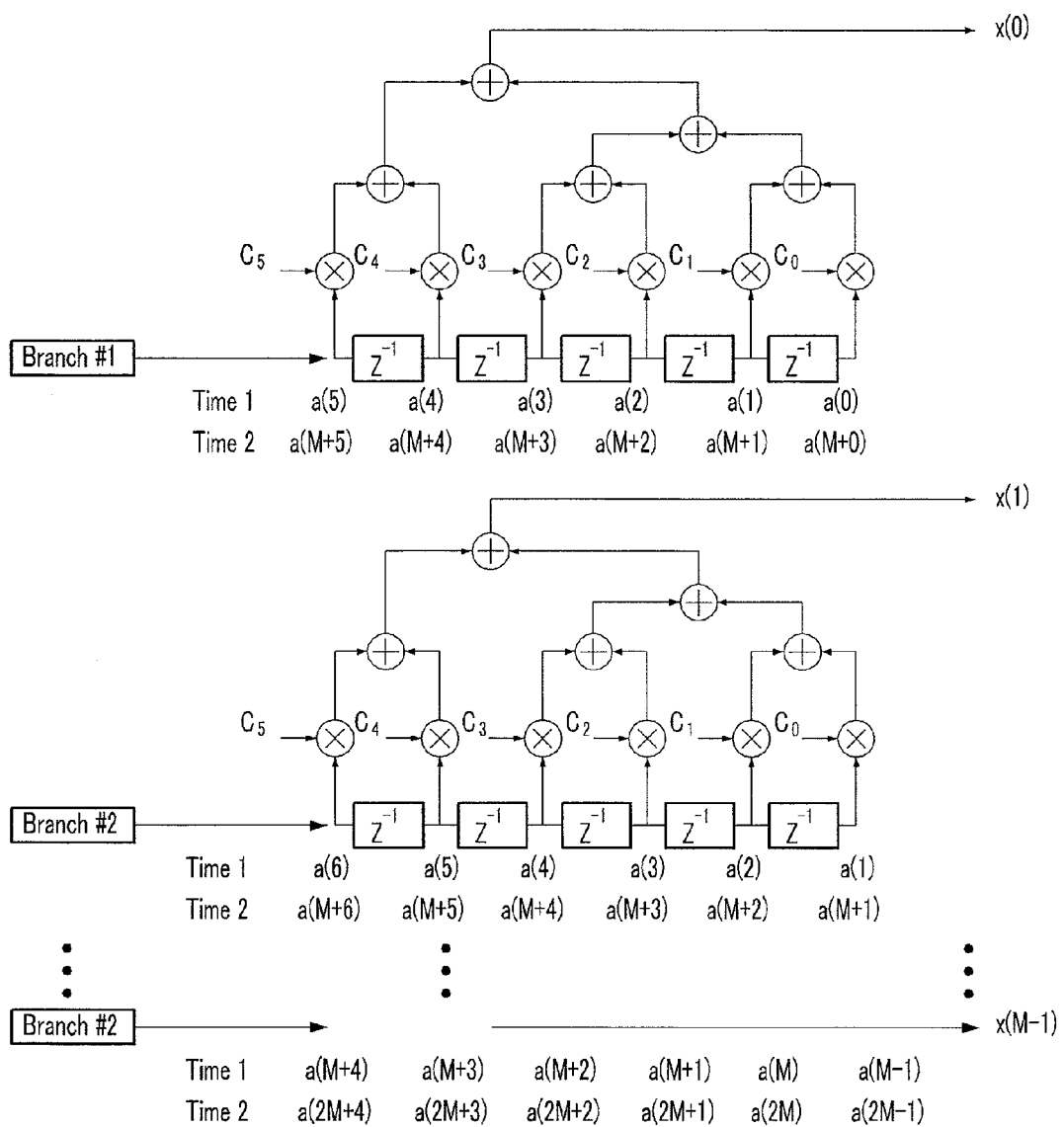
FIG. 3B shows a general parallel processing digital matched filter structure.

FIG. 3A and FIG. 3B respectively show a general finite impulse response (FIR) digital filter structure and a general parallel processing based digital matched filter structure.

First, FIG. 3A shows an FIR filter structure for realizing a general matched filter.

The FIR filter is formed of a memory 310, a multiplier 320, and an adder 330. However, the FIR filter requires high-speed digital signal processing in order to process a received signal that is sampled with high speed in a UWB modulation/demodulation structure.

Therefore, as shown in FIG. 3B, the processing speed may be decreased through parallel processing of the digital matched filter. However, the digital matched filter can process a signal with a 1/m frequency by performing parallel operation with M branches, but it has a drawback of increasing the area by M times.

Figure 3C:
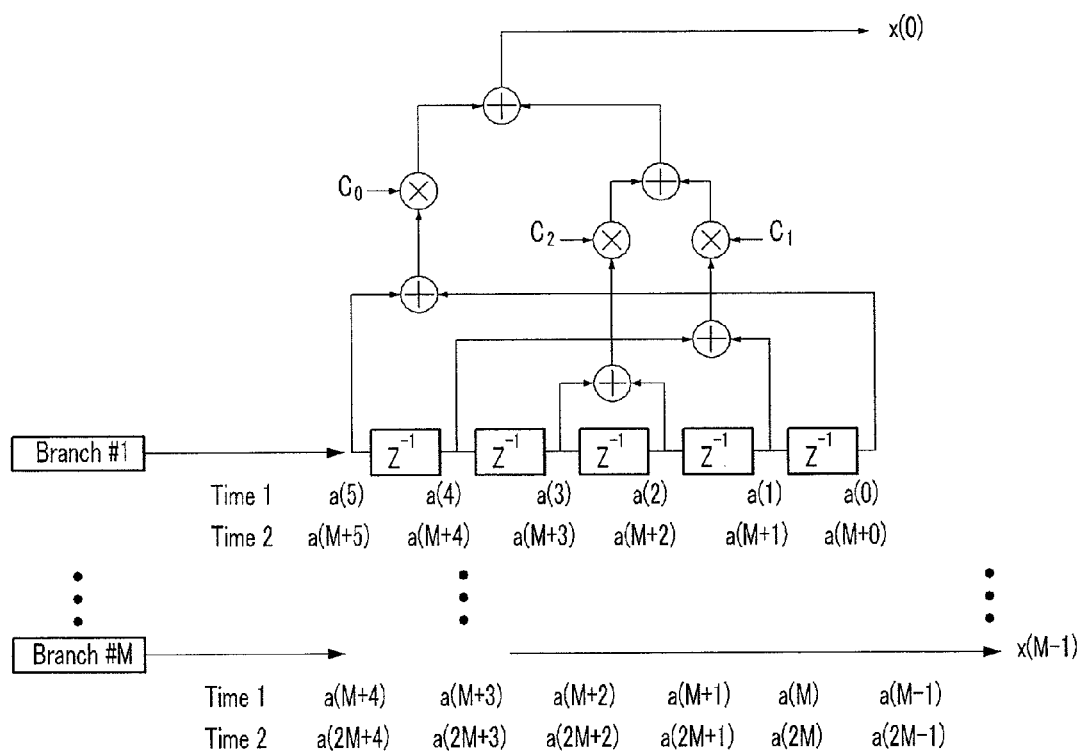
FIG. 3C shows an efficient parallel processing digital matched filter according to an exemplary embodiment of the present invention.

In order to overcome the above-described drawback, a structure of an efficient parallel processing digital matched filter according to the exemplary embodiment of the present invention is provided as shown in FIG. 3C.

Referring to FIG. 3C, the digital matched filter 300a according to the exemplary embodiment of the present invention can reduce the number of multipliers of a filter of each branch to be half by using an even-function symmetry characteristic of the filter coefficient.

That is, like a root raised cosine (RRC) filter, a transmission pulse shaping filter used in the impulse signal-based wireless communication system uses a coefficient having a linear phase characteristic. Therefore, the filter coefficient can reduce the number of multipliers of a filter in each branch to half by using the even-function symmetry characteristic as given in Equation 2.

$$x(k) = \sum_{l=0}^{(L-1)/2-1} C_l \begin{bmatrix} a(k+L-1-l) + \\ a(k+1) \end{bmatrix} + C_{\frac{L-1}{2}} a(k + (L-1)/2) \quad \text{[Equation 2]}$$

(L is an even number)

$$x(k) = \sum_{l=0}^{(L-1)/2-1} C_l [a(k+L-1-l) + a(k+1)]$$

(L is an odd number)

Next, the correlator 400 outputs correlation values of impulse preambles of the received signal by using a correlation characteristic. The original purpose of the correlator 400 is to acquire packet detection and synchronization, that is, to acquire initial synchronization of a packet by using an output of the matched filter 300.

In addition to the original purpose of the correlator, the correlator 400 according to the exemplary embodiment of the present invention uses the output value thereof to control a voltage level of the received signal so that an additional block for measuring a received signal strength intensity (RSSI) is not required. Accordingly, the system can be easily realized and operated, and a gain can be acquired from an area point of view.

Figure 4A:
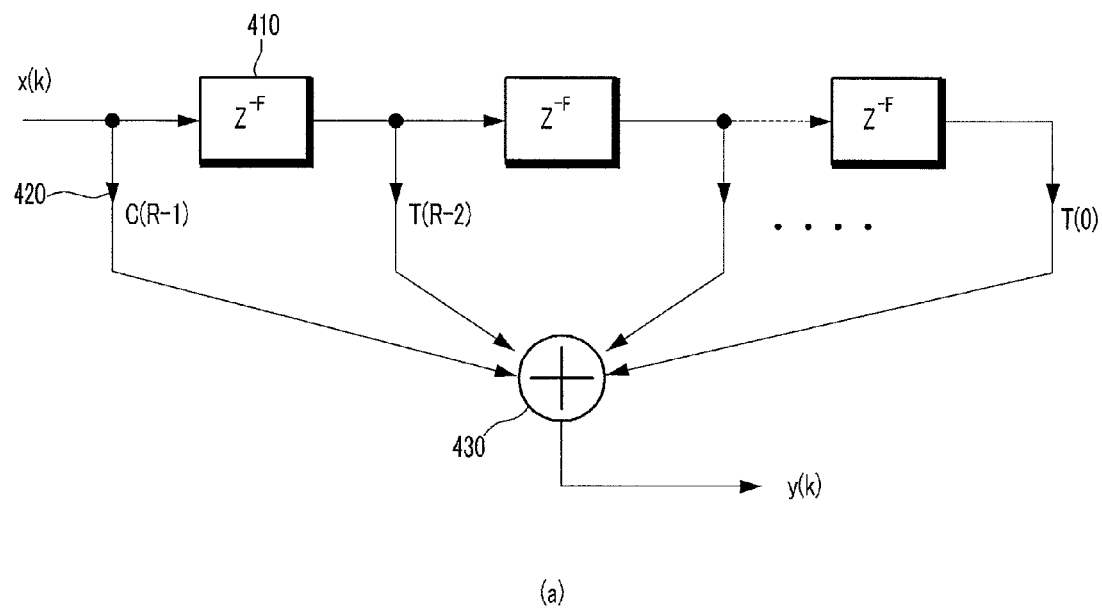
FIG. 4A shows an impulse ultra wideband preamble correlator structure.
Figure 4B:
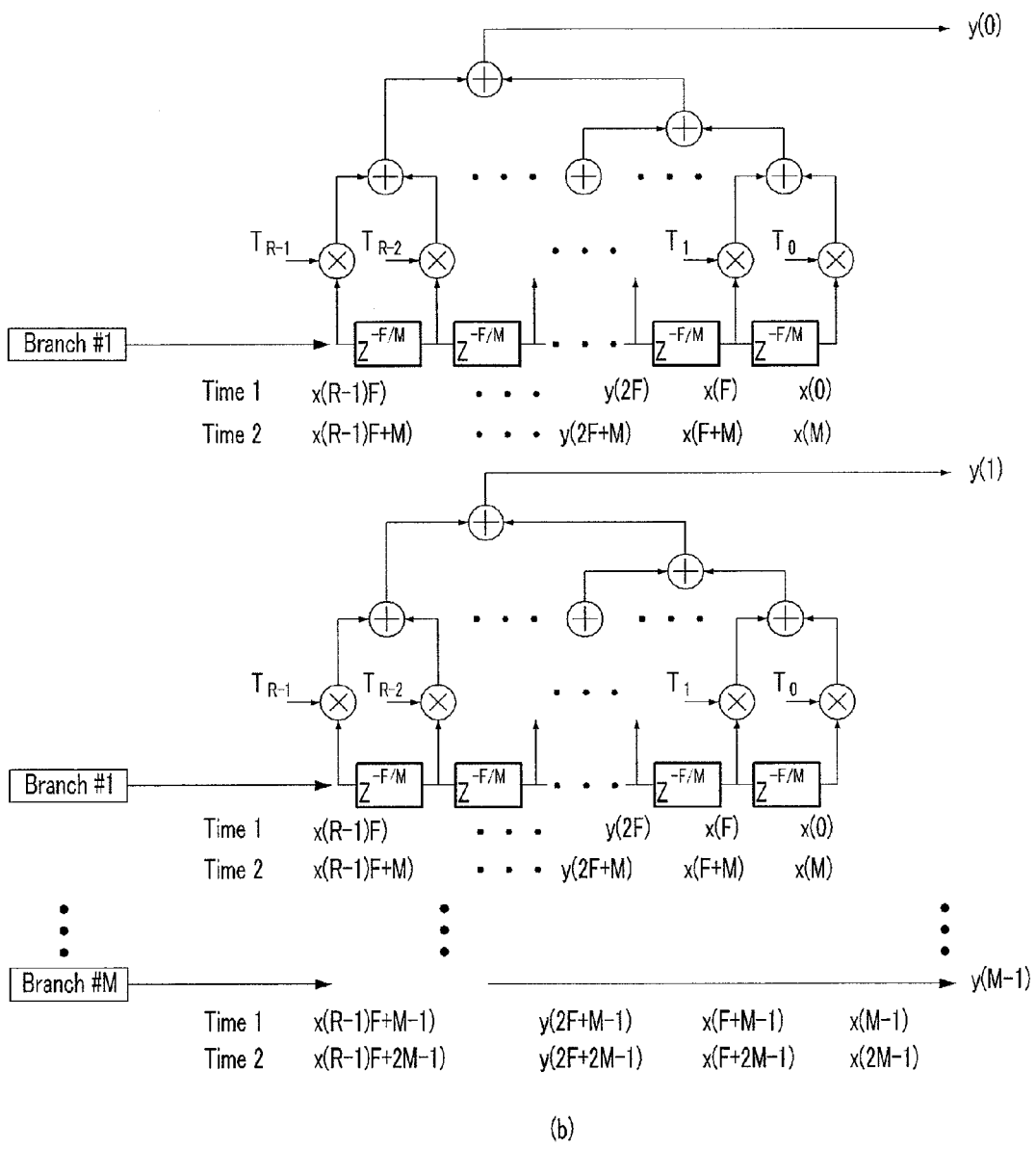
FIG. 4B shows a parallel processing preamble correlator structure according to the exemplary embodiment of the present invention.

FIG. 4A and FIG. 4B respectively show an impulse UWB preamble correlator structure and a parallel processing preamble correlator structure.

FIG. 4A shows an impulse UWB preamble correlator structure for direct realization, and can be represented as given in Equation 3.

$$y(k) = \sum_{r=0}^{R-1} x(k + rF) \cdot T(r) \quad \text{[Equation 3]}$$

Here, x(k) denotes a signal output from the matched filter 300, y(k) denotes a correlation value, and $T_r(r=0, 1, \ldots, R-1)$ denotes a coefficient of a sequence of a preamble symbol.

In addition, an impulse UWB preamble has an F clock time interval for each pulse. Therefore, when the number of sequence of a preamble symbol is R, the number of samples S for a single preamble symbol is equal to F×R as given in Equation 4.

$$\begin{aligned} S &= F \times R \\ &= M \times N \\ &= M \times C \times R \end{aligned} \quad \text{[Equation 4]}$$

In addition, when a single symbol is divided by N groups of M, each symbol may be defined by (M×N), and when C is defined by the number of over-samplings, each symbol may be represented as (M×C×R).

If the coefficient values of the sequence of the preamble symbol are 1, 0, and −1, a multiplier 420 does not substantially perform a multiplication operation, and accordingly, the correlator can be implemented by the adders 430 without multiplications. In order to process a high-speed sampled received signal, a high-speed correlator 400 is required, and operation speed can be decreased through parallel processing with M branches as shown in FIG. 4B instead of using the high-speed operator. In this case, the size of a delay element 410 should be F/M in parallel processing with M branches.

The adder 500 outputs the maximum correlation value for each symbol by using the correlation values output from the correlator 400. Also, the adder 500 divides one symbol period into N groups, obtains average values by adding every M correlation value for each group, and outputs a maximum value among the averages values during one symbol period.

For example, in the parallel processing with M branches, M correlation values are simultaneously output, and therefore the maximum value can be extracted by comparing average values obtained by simultaneously adding M correlation values during one symbol period.

In addition, the adder 500 may arrange the correlation values output from the correlator 400 in ascending order in consideration of correlation energy spread due to channel multipaths, and then output an average of partial large-sized correlation values.

The comparator 600 compares an average value of correlation values output from the adder 500 with a predetermined threshold value to determine an attenuation gain. In addition, the comparator 600 outputs the determined attenuation gain to the gain controller 700. That is, the comparator 600 sets the attenuation gain when the output value of the adder 500 excesses a threshold voltage. Otherwise, the comparator 600 sets the attenuation gain to zero.

The gain controller 700 receives the attenuation gain output from the comparator 600 to calculate a gain value to be changed by reflecting the received attenuation gain in current gain setting and feeds back the calculated gain value to the analog circuit unit 100 for turning on/off the LNA 120, or controls to set or change a gain of the VGA 150.

Referring to FIG. 5, an automatic gain control method using an efficient receiving structure of the impulse signal-based UWB wireless communication system according to the exemplary embodiment of the present invention will be described.

FIG. 5 is a flowchart of an automatic gain control method of the impulse signal-based wireless communication system according to the exemplary embodiment of the present invention.

In FIG. 5, it is assumed that the automatic gain control method according to the exemplary embodiment of the present invention is based on the configuration of the automatic gain controller of FIG. 2, and the automatic gain control method is performed in correspondence with an external signal receiving process of a receiving apparatus.

In a receiving state, the automatic gain controller is turned on and the mode is changed to an operation mode, an initial gain setting of the VGA 150 is set to the maximum gain value within an available range, and all the related variables are initialized (S501). In this case, an initial gain value of the VGA 150 is set to the full gain value in order to increase the communication distance between the transmitter and the receiver as much as possible in the step of S501.

It is determined whether a packet is received or not (S502). In the step of S502, the correlation value output from the adder 500 is compared with a constant threshold value so as to determine whether the receiving device receives a packet. If the correlation value is greater than the threshold value so that a packet is received, a process for controlling a gain of the VGA 150 by determining the size of the correlation value is performed. Otherwise, waiting for receipt of a packet is continued.

When the packet is received, whether the packet receiving is terminated is determined (S503) before the starting of AGC operation. The step of S503 is for the automatic gain controller to set the gain of the VGA 150 to the initial state and prepare receiving of the next packet when the receiving of the packet is terminated.

When the receiving of the packet is not terminated, whether synchronization is acquired is determined (S504). This is because, the synchronization acquisition process should be performed after the termination of the AGC operation and the gain should not be further changed until the packet receiving is terminated once the synchronization acquisition is achieved.

When the synchronization acquisition is not achieved, whether a current period is an AGC operation period is determined (S505). The step of S505 is performed for controlling the AGC operation period to be activated only during a predetermined period of preamble signals. For example, each symbol of the preambles is counted and the AGC apparatus may be set to operate during a limited symbol period among the symbols. Therefore, if the current period is not the AGC operation period, the current period may be divided into a time at termination of the AGC operation and a time after termination of the AGC operation.

If it is determined in the step S505 that the current period is not the AGC operation period, it is determined whether the AGC operation is just terminated (S511), and a flag for instruction of synchronization acquisition process is generated if the AGC operation is just terminated (S512). Then, the number of symbols during receiving of preamble symbols is counted (S513). In this case, if synchronization is not acquired even though the AGC operation is terminated, the number of symbols may be continuously counted.

If it is determined in the step S505 that the current period is the AGC operation period, a correlation value generated by the adder 500 within the AGC operation period is compared with the threshold value (S506) and the attenuation gain is determined in next step (S508). Here, the correlation value is compared with a first threshold value. In the step S506, if the attenuation gain is set to be the larger, the received signals will be the more promptly converged.

In this case, if the correlation value is greater than the first threshold value in the comparison of the step S506, the attenuation gain is determined (S508) and a gain to be applied to the LNA 120 and the VGA 150 is accordingly determined, and the gain is fed back to the analog circuit unit 100 for receiving gain control (S510). The attenuation gain may be determined as given in Equation 5. An attenuation gain (step) is subtracted from a current gain (Gain).

$$\text{Gain} = \text{Gain} - \text{step} \quad \text{[Equation 5]}$$

If the correlation value is not greater than the first threshold value in the comparison of the step S506, the correlation value within the AGC operation period is compared with a second threshold value (S507). In the step S507, the threshold value is determined to be approximate to a threshold value for convergence so as to finely control the receiving gain, and the attenuation gain is set to be small for gradual convergence.

The attenuation gain is determined according to the comparison result of the step S507 (S509), and the next process (S510) is performed.

The preamble symbol is counted (S513). In next step (S514), exceptions such as the termination of the preambles before the synchronization or occurring an abnormal correlation value were checked and processed.

When the correlation value is greater than the threshold value not due to a normal process sequence but due to noise, the gain may be changed. Since synchronization is not acquired even though the gain is changed in such an abnormal condition, the symbol count value may be greater than the number of preamble symbols. That is, when the synchronization cannot be acquired during the preamble period, the process is changed back to the initial variable setting process, that is, the step S501, so as to prevent incorrect setting of the gain.

As described, according to the AGC method of the exemplary embodiment of the present invention, the above-described processes are performed for each preamble symbol at initial receipt of the preamble to control the correlation value to be smaller than the threshold value within the AGC operation period to thereby control the gain of the VGA 150. Accordingly, the receiving voltage gain can be maintained in the optimum SNR condition.

In addition, the AGC method according to the exemplary embodiment of the present invention maximizes a gain in an early stage of receiving, and then gradually reduces the gain to maintain an optimum receiving state so that the receiving gain of the impulse signal-based wireless system can be stably controlled without being influenced by over-shoot or under-shoot of the receiving gain.

Figure 6:
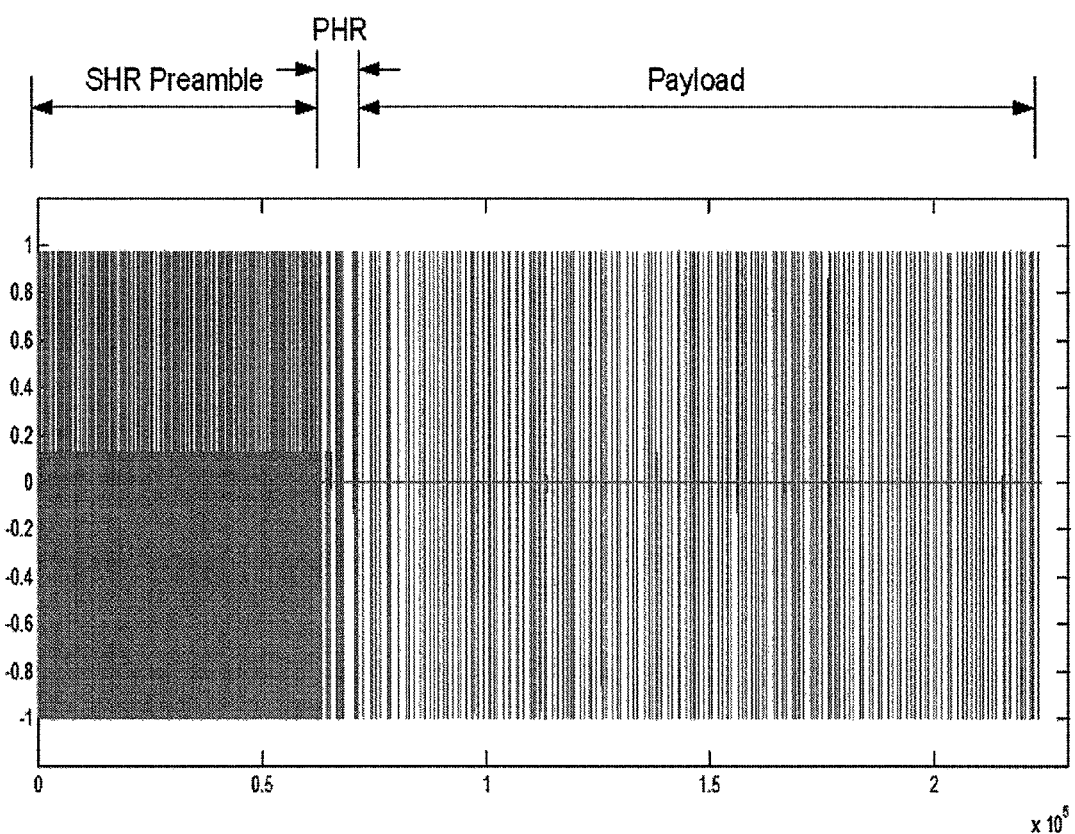
FIG. 6 exemplary shows an output waveform of the impulse signal based UWB wireless communication system.

FIG. 6 shows a normalized output waveform of the impulse signal-based UWB wireless communication system. A transmission frame is formed of a preamble symbol period SHR, a PHY header period PHR, and a payload Payload.

Figure 7A:
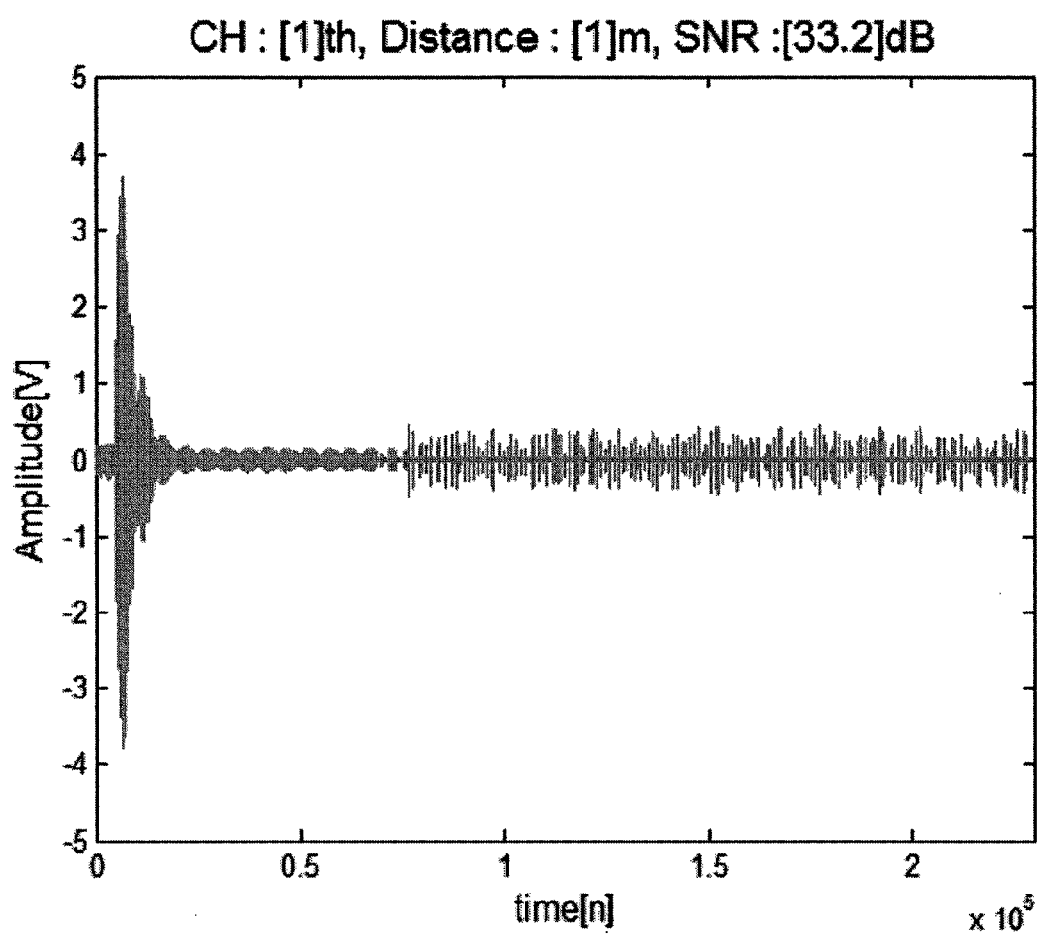
FIG. 7A shows a baseband analog signal waveform in 1 m distance simulation according to the exemplary embodiment of the present invention.
Figure 7B:
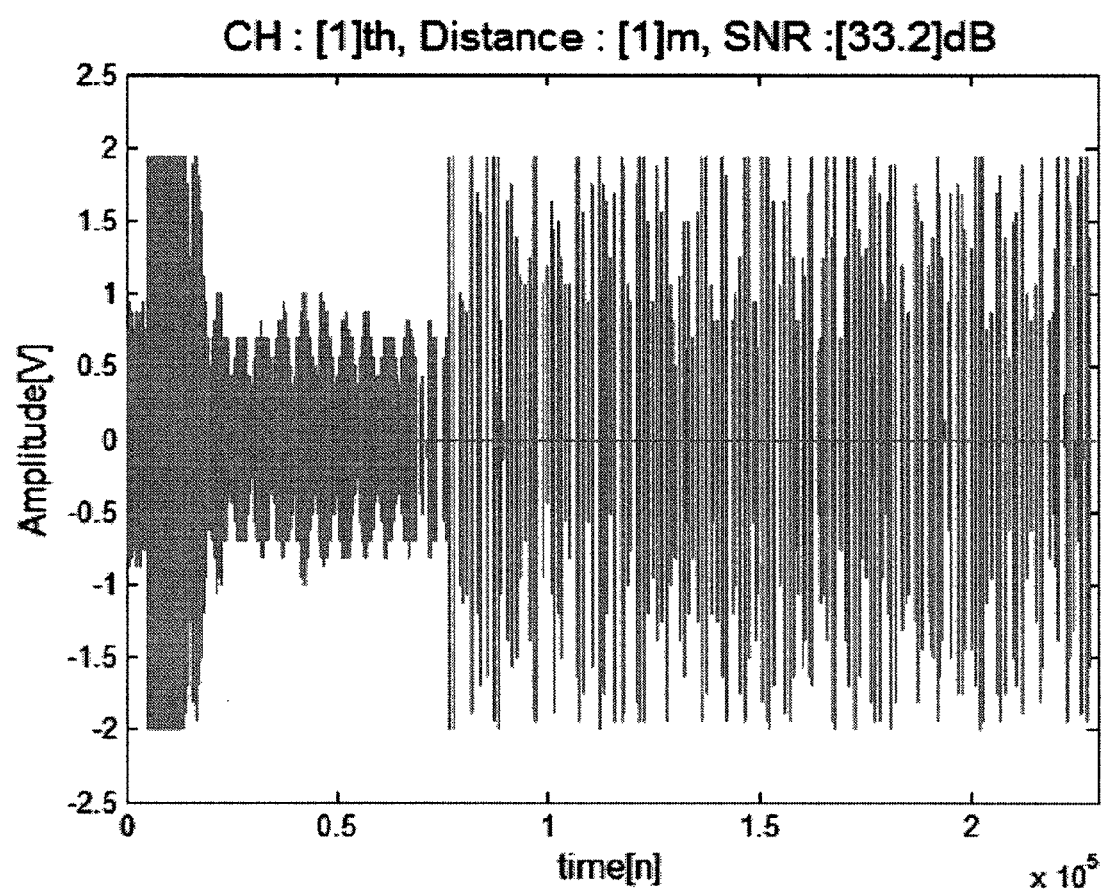
FIG. 7B shows a matched filter output signal waveform in 1 m distance simulation according to the exemplary embodiment of the present invention.

FIG. 7A and FIG. 7B respectively show a baseband analog signal waveform and a matched filter output signal waveform in a simulation with a distance of 1 m according to the exemplary embodiment of the present invention.

Referring to FIG. 7A and FIG. 7B, a carrier frequency offset between transmitting and receiving devices is set to 100 KHz, and a clock offset between the transmitting and receiving devices is set to 30 KHz in a UWB radio channel model for the simulation.

According to the condition of FIG. 7, the transmitting device and the receiving device are separated with a distance of 1 m so that a signal with high energy is received at the receiving device due to a high SNR region. In general, a received signal with high energy saturates a radio frequency (RF), an analog element, and ADC output characteristics, thereby causing severe performance degradation. However, the signal level can be controlled to be appropriate to an ADC input range within several symbols according to the AGC method of the exemplary embodiment of the present invention so that the performance degradation can be prevented.

FIG. 7A shows that the AGC starts operating at the moment that a receiving signal is input to an ADC input end as a baseband analog real part signal, and the signal is adjusted to an ADC input range through AGC operations for 20 preamble symbols.

FIG. 7B shows that a digital-converted signal through a 4-bit ADC is adjusted to have an optimum SNT through the matched filter 300.

Figure 8A:
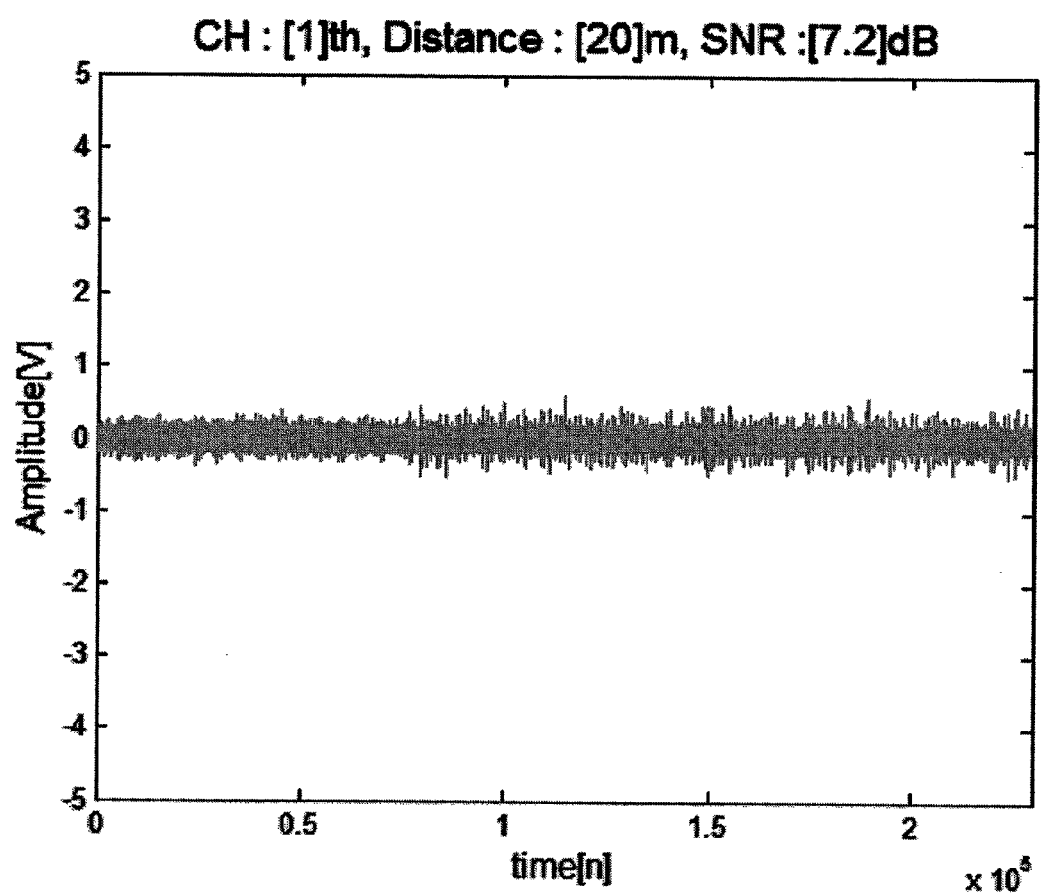
FIG. 8A shows a baseband analog signal waveform in 20 m distance simulation according to the exemplary embodiment of the present invention.
Figure 8B:
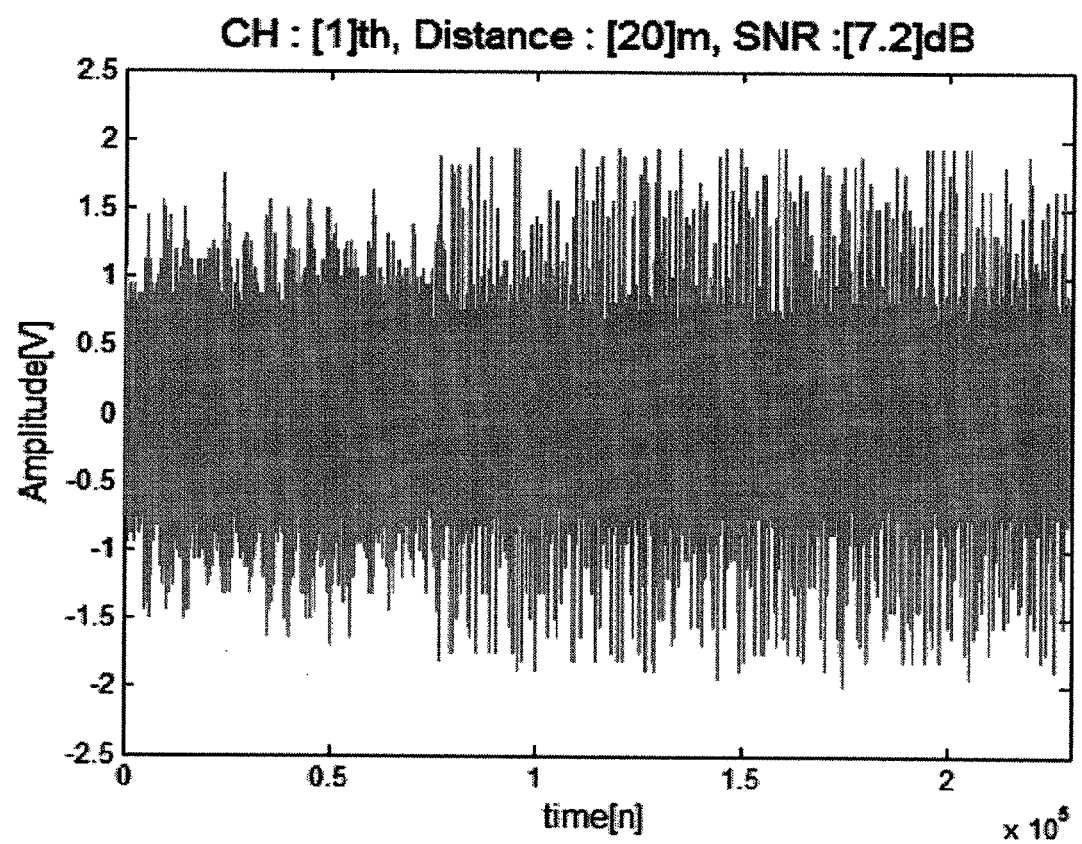
FIG. 8B shows a matched filter output signal waveform in 20 m distance simulation according to the exemplary embodiment of the present invention.

FIG. 8A and FIG. 8B respective show baseband analog signal waveforms and matched filter output signal waveforms in the 20 m distance simulation according to the exemplary embodiment of the present invention.

Referring FIG. 8A and FIG. 8B, results of a simulation run where a transmitter and a receiver are separated by 20 m so that an initial noise area and a signal area cannot be easily distinguished due to a low SNR area. In this case, a SNR characteristic is very sensitive to a receiving gain error so that the performance may be significantly deteriorated.

In this circumstance, the receiving gain can be adjusted to an optimum level through fine receiving gain control according to the exemplary embodiment of the present invention so that the communication distance can be maximized.

Figure 9:
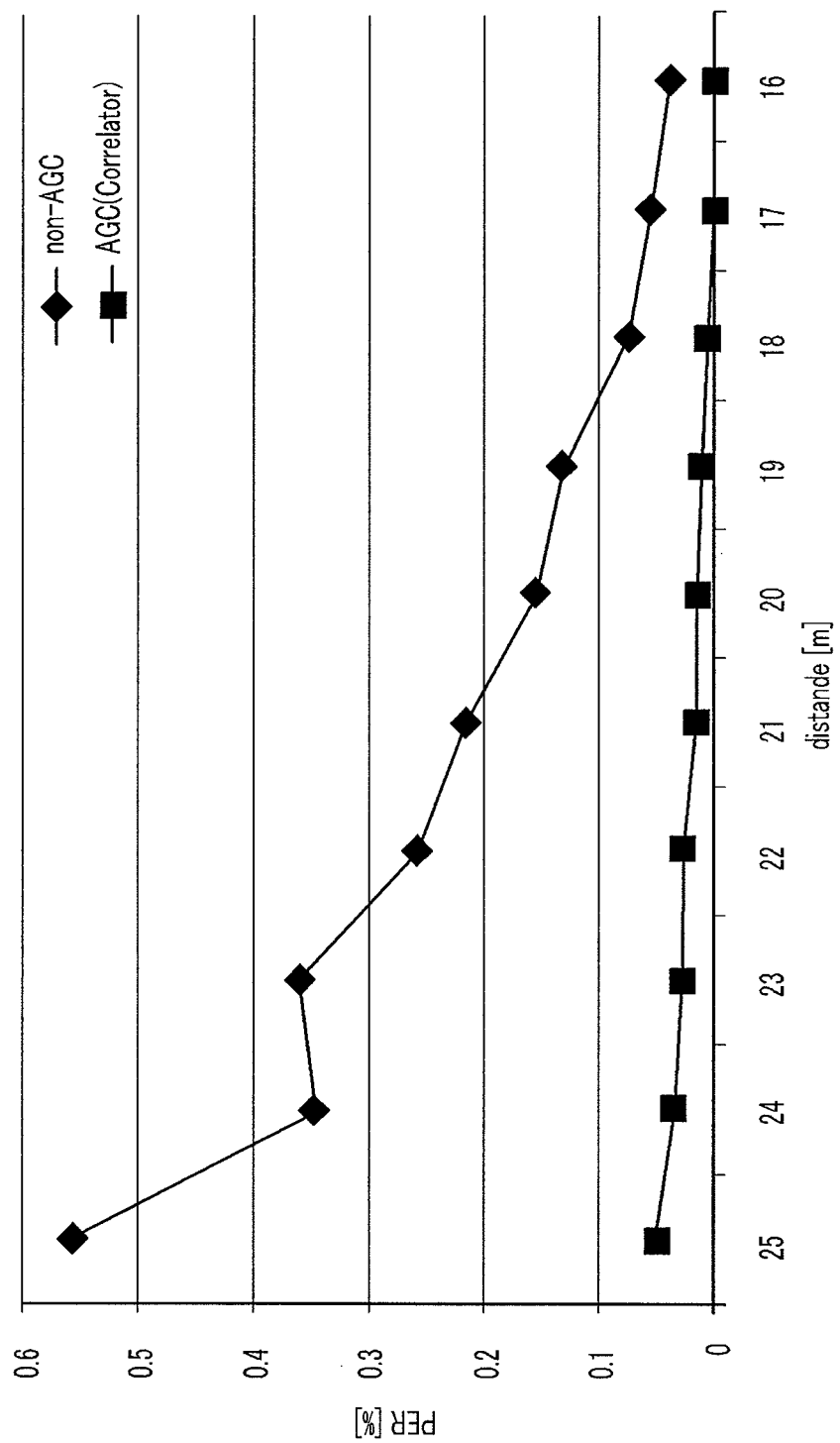
FIG. 9 shows a performance comparison graph in comparison with a fixed receiving gain structure.

FIG. 9 shows a performance comparison graph for comparing the fixed receiving gain structure according to the exemplary embodiment of the present invention.

Referring to FIG. 9, a result of comparison between performance of a structure where the AGC is not provided due to distance in the channel as shown in FIG. 7 and FIG. 8 and performance of a structure that employs the AGC according to the exemplary embodiment of the present invention is shown. That is, when the transmitter and the receiver are separated, performance can be stably maintained by employing the AGC according to the exemplary embodiment of the present invention.

Figure 10:
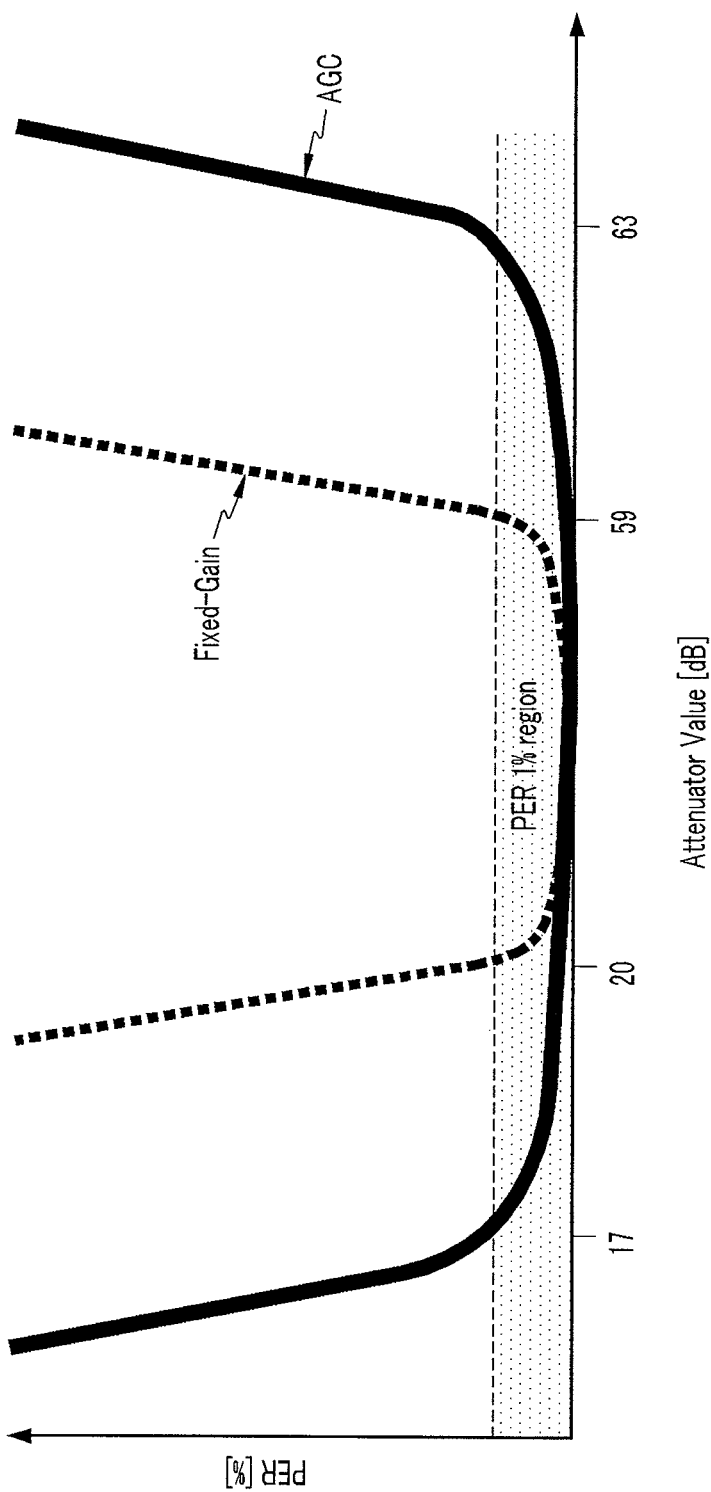
FIG. 10 shows a hardware experiment result in comparison with the fixed receiving gain structure.

FIG. 10 shows a hardware experiment result that compares the fixed receiving gain structure according to the exemplary embodiment of the present invention.

Referring to FIG. 10, an arbitrary attenuation device is provided between the transmitter and the receiver through a cable, and a range that satisfies a 1% packet error ratio (PER) region is measured by varying the attenuation device.

In this case, when the receiving gain is fixed to the maximum value, a range of the attenuation device that satisfied the 1% PER region was 20 dB to 59 dB, and when the AGC according to the exemplary embodiment of the present invention was used, the range was 17 dB to 63 dB. Through this experiment, the AGC according to the exemplary embodiment of the present invention achieves a dynamic range gain of about 17 dB.

As described, the AGC according to the exemplary embodiment of the present invention can maintain an optimum SNR in various remote and indoor wireless channel environments through an efficient receiving structure for digital signal processing and an automatic voltage gain controlling method.

In addition, according to the exemplary embodiments of the present invention, since a gain set to the maximum in an early stage of receiving is gradually reduced to maintain an optimum receiving state, the receiving gain of the impulse signal-based wireless system can be stably controlled without being influenced by over-shoot or under-shoot of the receiving gain.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic gain control (AGC) apparatus in an impulse signal-based wireless communication system, comprising:

a matched filter that attains a signal to noise ratio (SNR) of a received signal received through an analog circuit unit, wherein the matched filter reduces the number of multipliers of a filter in each branch to half by using an even-function symmetry characteristic as given in $$x(k) = \sum_{l=0}^{(L-1)/2-1} C_l[a(k+L-1-l) + a(k+1)] + C_{\frac{L-1}{2}} a(k+(L-1)/2)$$

(L is an even number), $$x(k) = \sum_{l=0}^{(L-1)/2-1} C_l[a(k+L-1-l) + a(k+1)]$$

(L is an odd number), wherein a(k) is a received input signal, $C_l$ (l=0, 1, . . . , L−1) is a coefficient of the matched filter and x(k) is an output signal;

a correlator that outputs correlation signals for a preamble signal of the received signal;

an adder that outputs a maximum correlation value at each symbol among correlation values of the correlation signals or divides a symbol period into a plurality of groups, obtains average values through a correlation value sum of each group, and outputs a maximum value among the average values as the maximum correlation value;

a comparator that compares the maximum correlation value output from the adder with at least one predetermined threshold value to determine an attenuation gain; and a gain controller that sets or changes gains of a low noise amplifier (LNA) and a variable gain amplifier (VGA) of the analog circuit unit based on the determined attenuation gain, wherein the comparator compares the maximum value that comes from the adder with the at least one threshold value to control a current gain at the gain controller.

2. The AGC apparatus of claim 1, wherein the gain controller receives the attenuation gain output from the comparator to calculate the gains to be changed by applying the attenuation gain to a current gain setting.

3. The AGC apparatus of claim 1, wherein the correlator determines whether a packet is received and synchronization of the packet is acquired by using an output of the matched filter.

4. The AGC apparatus of claim 1, wherein the correlator is realized only by the adder without performing a multiplication operation, and parallel-processes an output of the matched filter.

5. An automatic gain control (AGC) method of an AGC apparatus in an impulse signal-based wireless communication system, comprising:
attaining a signal to noise ratio (SNR) by parallel-processing a signal received through an analog circuit unit and outputting correlation values for impulse preambles of the received signal;
outputting a maximum correlation value at each symbol among the correlation values, or dividing a symbol period into a plurality of groups, obtaining average values through a correlation value sum of each group, and outputting a maximum value among the average values as the maximum correlation value;
comparing the maximum correlation value with at least one predetermined threshold value to determine an attenuation gain, wherein the attenuation gain is determined as Gain=Gain−step, wherein an attenuation gain step (step) is subtracted from a current gain (Gain);
arranging the correlation values in ascending order in consideration of correlation energy spread due to channel multipaths, and then outputting an average of partial large-sized correlation values as the maximum correlation value;
comparing the average of partial large-sized correlation values with the at least one threshold value and accordingly decreasing the current gain; and
setting or changing gains of a low noise amplifier (LNA) or a variable gain amplifier (VGA) of the analog circuit unit based on the determined attenuation gain;
counting symbols; and
initializing the current gain when a value of the counted symbols is greater than a number of preamble symbols and synchronization is not acquired during a preamble period.

6. The AGC method of claim 5, further comprising, initializing variables related to the gain before the setting the gain of the VGA to an available maximum value.

7. The AGC method of claim 5, further comprising,
determining whether a packet is received, and when the packet is received, determining whether packet receiving is terminated;
determining whether the synchronization is acquired when the packet receiving is not terminated; and
determining whether a current period is an AGC operation period when the synchronization is not acquired,
wherein the comparing the maximum correlation value compares the maximum correlation value with the at least one predetermined threshold value when the current period is an AGC operation period.

8. The AGC method of claim 7, wherein the determining of whether the packet is received is determining whether a packet is received at a receiving unit by comparing the correlation value with the predetermined threshold value.

9. The AGC method of claim 5, wherein the comparing the maximum correlation value comprises:
comparing the maximum correlation value with a first threshold value;
determining the attenuation gain when the maximum correlation value is greater than the first threshold value; or
comparing the maximum correlation value with a second threshold value if the maximum correlation value is not greater than the first threshold value and determining the attenuation gain if the maximum correlation value is greater than the second threshold value.

10. The AGC method of claim 5, wherein, in the setting or changing gains of the LNA or the VGA, a gain set by an abnormal correlation value under a condition that synchronization is not acquired during a preamble period is initialized.

11. An automatic gain control (AGC) apparatus in an impulse signal-based wireless communication system, comprising:
a matched filter that attains a signal to noise ratio (SNR) of a received signal received through an analog circuit unit, wherein when a received input signal is a(k), a coefficient of the matched filter is $C_l$ (l=0, 1, ..., L−1) and an output signal is x(k), the matched filter is expressed as given in $$x(k) = \sum_{l=0}^{(L-1)/2-1} C_l[a(k+L-1-l)+a(k+1)] + C_{\frac{L-1}{2}} a(k+(L-1)/2)$$

(L is an even number)

$$x(k) = \sum_{l=0}^{(L-1)/2-1} C_l[a(k+L-1-l)+a(k+1)]$$

(L is an odd number);
a correlator that outputs correlation signals for a preamble signal of the received signal;
an adder that outputs a maximum correlation value at each symbol among correlation values of the correlation signals or divides a symbol period into a plurality of groups, obtains average values through a correlation value sum of each group, and outputs a maximum value among the average values as the maximum correlation value;
a comparator that compares the maximum correlation value output from the adder with at least one predetermined threshold value to determine an attenuation gain, wherein the attenuation gain is determined as Gain=Gain−step, wherein an attenuation gain step (step) is subtracted from a current gain (Gain); and
a gain controller that sets or changes gains of a low noise amplifier (LNA) and a variable gain amplifier (VGA) of the analog circuit unit based on the determined attenuation gain.

12. The AGC apparatus of claim 11, wherein the correlator determines whether a packet is received and synchronization of the packet is acquired by using an output of the matched filter.

13. An automatic gain control (AGC) apparatus in an impulse signal-based wireless communication system, comprising:
a matched filter that attains a signal to noise ratio (SNR) of a received signal received through an analog circuit unit, wherein the matched filter reduces the number of multipliers of a filter in each branch to half by using an even-function symmetry characteristic;
a correlator that outputs correlation signals for a preamble signal of the received signal;
an adder that outputs a maximum correlation value at each symbol among correlation values of the correlation signals or divides a symbol period into a plurality of groups, obtains average values through a correlation value sum of each group, and outputs a maximum value among the average values as the maximum correlation value;

a comparator that compares the maximum correlation value output from the adder with at least one predetermined threshold value to determine an attenuation gain; and a gain controller that sets or changes gains of a low noise amplifier (LNA) and a variable gain amplifier (VGA) of the analog circuit unit based on the determined attenuation gain, wherein after determining the attenuation gain by the gain controller, the attenuation gain is initialized when a value of counted symbols is greater than a number of preamble symbols and synchronization is not acquired during a preamble period.

14. An automatic gain control (AGC) method of an AGC apparatus in an impulse signal-based wireless communication system, comprising:

attaining a signal to noise ratio (SNR) by parallel-processing a signal received through an analog circuit unit by a matched filter and outputting correlation values for impulse preambles of the received signal, wherein the matched filter reduced the number of multipliers of a filter in each branch to half by using an even-function symmetry characteristic;

outputting a maximum correlation value at each symbol among the correlation values, or dividing a symbol period into a plurality of groups, obtaining average values through a correlation value sum of each group, and outputting a maximum value among the average values as the maximum correlation value;

comparing the maximum correlation value with at least one predetermined threshold value to determine an attenuation gain, wherein the attenuation gain is determined as Gain=Gain−step, wherein an attenuation gain step is subtracted from a current gain (Gain);

arranging the correlation values in ascending order in consideration of correlation energy spread due to channel multipaths, and then outputting an average of partial large-sized correlation values as the maximum correlation value;

comparing the average of partial large-sized correlation values with the at least one threshold value and accordingly decreasing the current gain; and setting or changing gains of a low noise amplifier (LNA) or a variable gain amplifier (VGA) of the analog circuit unit based on the determined attenuation gain;

counting symbols; and initializing the current gain when a value of the counted symbols is greater than a number of preamble symbols and synchronization is not acquired during a preamble period.

* * * * *